(12) United States Patent
Matsugashita

(10) Patent No.: US 8,321,415 B2
(45) Date of Patent: Nov. 27, 2012

(54) SERVER APPARATUS, METHOD OF INSPECTING LOGS FOR THE SAME, AND STORAGE MEDIUM

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 12/969,149

(22) Filed: Dec. 15, 2010

(65) Prior Publication Data
US 2011/0161337 A1  Jun. 30, 2011

(30) Foreign Application Priority Data

Dec. 28, 2009  (JP) ................................ 2009-298348

(51) Int. Cl.
*G06F 7/00* (2006.01)
*G06F 17/30* (2006.01)
(52) U.S. Cl. ..................................................... 707/736
(58) Field of Classification Search .................. None
See application file for complete search history.

(56) References Cited

U.S. PATENT DOCUMENTS

| | | | |
|---|---|---|---|
| 5,625,757 A * | 4/1997 | Kageyama et al. ......... 358/1.14 |
| 2005/0111045 A1 * | 5/2005 | Imai ............................. 358/1.18 |
| 2007/0091361 A1 * | 4/2007 | Matsugashita ............... 358/1.15 |
| 2007/0169204 A1 * | 7/2007 | Janakiraman et al. .......... 726/28 |
| 2007/0226776 A1 * | 9/2007 | Tsugawa ............................ 726/1 |
| 2008/0005176 A1 * | 1/2008 | Shimizu ..................... 707/104.1 |
| 2008/0198407 A1 * | 8/2008 | Fukudome ................... 358/1.15 |
| 2008/0243835 A1 * | 10/2008 | Suzuki .............................. 707/5 |
| 2008/0313156 A1 * | 12/2008 | Hirahara .......................... 707/3 |
| 2009/0097066 A1 | 4/2009 | Fukudome |

FOREIGN PATENT DOCUMENTS

| | | |
|---|---|---|
| JP | 2007-280362 A | 10/2007 |
| WO | WO 2007105827 A1 * | 9/2007 |

* cited by examiner

*Primary Examiner* — Pierre Vital
*Assistant Examiner* — Taelor Kim
(74) *Attorney, Agent, or Firm* — Canon USA Inc IP Division

(57) ABSTRACT

An inspection server receives a search condition for print logs accumulated in a print log database from an inspection client PC, and an associated log setting for associating print jobs searched based on the search condition with logs managed by a log management server. The inspection server obtains a search result for a search request from an archive server, and further obtains a number of hits for the search request for associated logs based on an associated log setting from a log collection server. Based on the search result and the number of hits, the inspection server controls a display mode of print logs contained in the search result.

6 Claims, 10 Drawing Sheets

FIG.10

| SEARCH RESULT | | | | | ~820 |
|---|---|---|---|---|---|
| FROM X TO XX IN XXX RESULTS ← 1 2 3 4 5 6 7 8 9 10 → | | | | | |
| DOCUMENT NAME | PRINTING START DATE AND TIME | USER NAME | COMPUTER NAME | ADDR | |
| NO ESSENTIAL LOG.xxx | 20090101 00:00:00 | AAA | PC | 192.1 | |
| NO ESSENTIAL LOG.xxx | 20090101 00:00:00 | AAA | PC | 192.1 | |
| NO HIT LOG.yyy | 20090101 00:00:00 | BBB | PC-1000 | 192.1 | |
| A FEW HIT LOGS.yyy | 20090101 00:00:00 | CCC | PC-1020 | 192.1 | ~1001 |
| A FEW HIT LOGS.yyy | 20090101 00:00:00 | CCC | PC-1020 | 192.1 | |
| A FEW HIT LOGS.yyy | 20090101 00:00:00 | CCC | PC-1020 | 192.1 | |
| A FEW HIT LOGS.yyy | 20090101 00:00:00 | CCC | PC-1020 | 192.1 | |
| ⋮ | | | | | |
| MANY HIT LOGS.zzz | 20090101 00:00:00 | DDD | PC-1030 | 192.1 | |

SERVER APPARATUS, METHOD OF INSPECTING LOGS FOR THE SAME, AND STORAGE MEDIUM

BACKGROUND OF THE INVENTION

1. Field of the Invention

The present invention relates to a server apparatus that inspects accumulated print logs, a method of inspecting logs for the server apparatus, and a storage medium.

2. Description of the Related Art

Image processing apparatuses such as printer and multi-function peripheral (MFP) are sometimes used for unauthorized printing of confidential documents including information of clients and data about designing, which causes information leakage.

Conventionally, to inspect determination of the source of information leakage and tracking of leakage paths, a system is known that stores print logs as trails of printing.

For example, Japanese Patent Application Laid-Open No. 2007-280362 discusses a method of storing print data and information such as date and time, job name, user name, image feature amount as a print log, to enable key search for target data or information and thereby inspection of unauthorized printing.

In the above method, however, the logs of authorized printing are accumulated as well as those of unauthorized printing, resulting in a large amount of print logs in apparatuses that are used daily for bulk printing. Accordingly, in some cases, certain assistance is indispensable to inspect and specify unauthorized printing, in addition to the information stored in the print logs.

SUMMARY OF THE INVENTION

According to an aspect of the present invention, a server apparatus is provided which communicates with a print log management server that accumulates and manages logs of print jobs processed in a printing apparatus and a user log management server that collects and manages logs of users who log in a client apparatus. The server apparatus includes a receiving unit configured to receive, from the client apparatus, a search condition for the accumulated logs of the print jobs and an associated log setting for associating logs of the print jobs searched under the search condition with the logs managed by the user log management server; a print log search result obtaining unit configured to output a search request corresponding to the search condition received by the receiving unit to the print log management server, and to obtain a search result for the search request from the print log management server; a user log search result obtaining unit configured to output an associated log search request corresponding to the associated log setting received by the receiving unit to the user log management server, and to obtain a number of hits for the associated log search request from the user log management server; and a control unit configured to control a display mode of print logs contained in the search result based on the search result obtained by the print log search result obtaining unit and the number of hits obtained by the user log search result obtaining unit.

According to exemplary embodiments of the present invention, printing logs and trails of computer operations associated with the logs are inspected, thus enabling more precisely identifying unauthorized printing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of a search result screen provided by an inspection UI.

DESCRIPTION OF THE EMBODIMENTS

Various exemplary embodiments, features, and aspects of the invention will be described in detail below with reference to the drawings.

Figure 1:
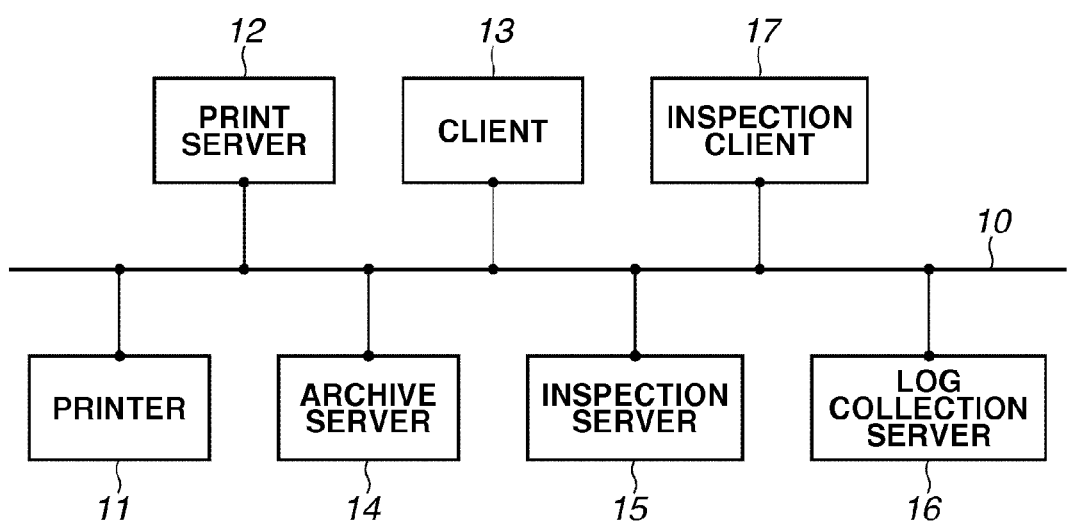
FIG. 1 is a block diagram illustrating a configuration of a data processing system according to an exemplary embodiment of the present invention.

FIG. 1 is a block diagram illustrating a configuration of a data processing system according to a first exemplary embodiment of the present invention. In FIG. 1, a network 10 connects various elements of the system to one another. A printer (printing apparatus) 11 outputs print data. A print server 12 is in communication with various printers (not illustrated) including the printer 11, and outputs print instructions to the apparatuses. A client apparatus (client) 13 outputs a print instruction to the print server 12 using an application in response to an operation by a user.

Figure 8:
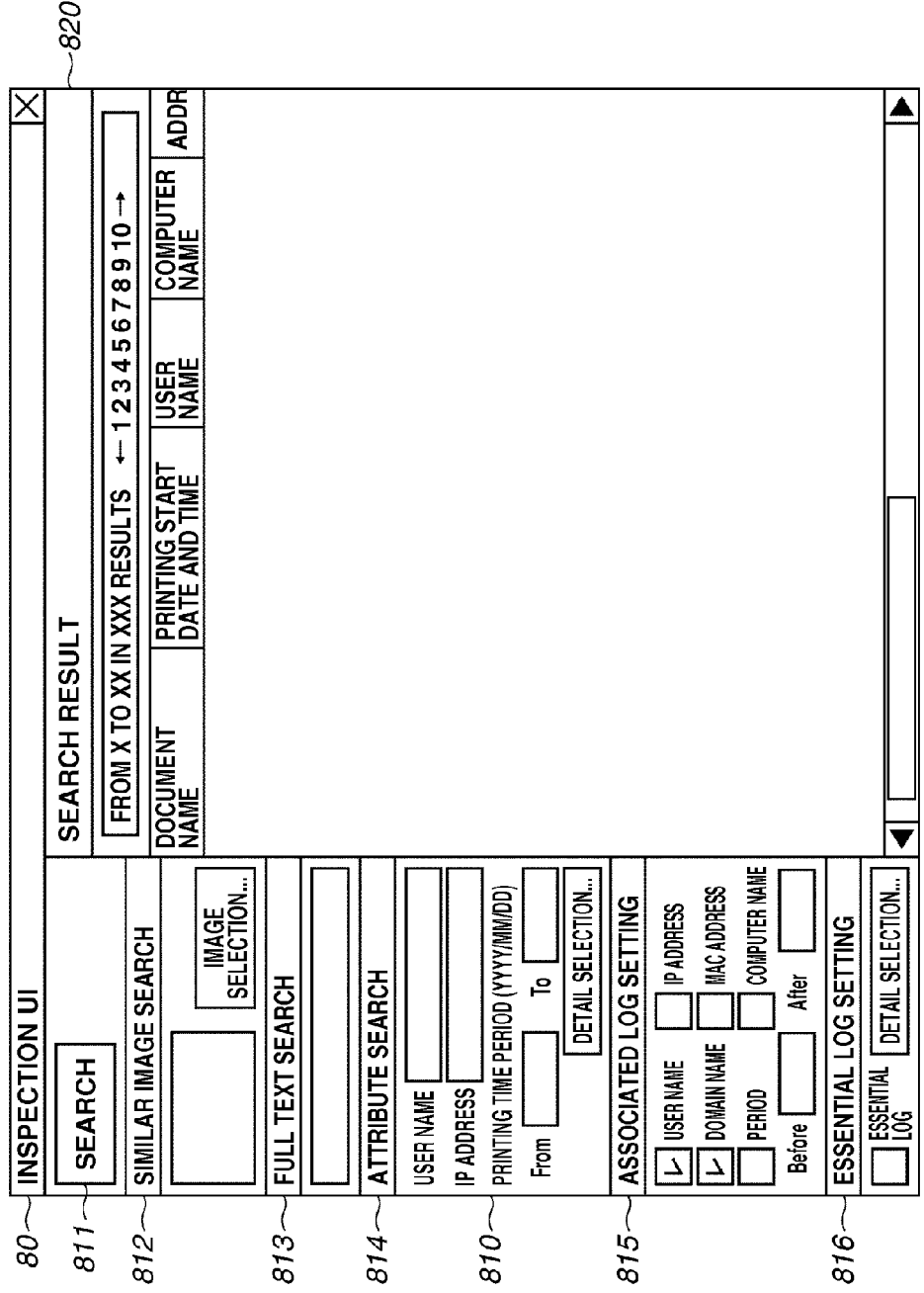
FIG. 8 illustrates an inspection user interface (UI) provided by an inspection application.

An archive server 14 serves as a print log management server, and accumulates and manages print logs. An inspection server 15 searches print logs accumulated in the archive server 14. A log collection server 16 serves as a user log management server, and collects and manages logs of operations performed by users at the client 13. An inspection client 17 accesses the inspection server 15, and inspects print logs. The inspection client 17 has a web browser function, and is configured to display an inspection UI (User Interface) provided by the inspection server 15. An inspection UI illustrated in FIG. 8 is configured to set an associated log that is associated with a search condition for print logs that is set via the inspection UI and the logs that are managed by the log collection server 16, and the set associated log is received by the inspection server 15.

The above elements are in communication with one another via the network 10. The communication may use web services such as HTTP (Hypertext Transfer Protocol) and SOAP (Simple Object Access Protocol) on HTTP, or two-way communication over TCP/IP (Transmission Control Protocol/Internet Protocol). In the print server 12, a printer driver for the printer 11 and an add-in module to obtain print logs are installed. In the client 13 also, both of the printer driver and the add-in module are installed through a point-and-print function.

In printing, print data is transmitted to the printer 11 via the print server 12 from the client 13, where a print process is executed. The client 13, which has the driver for the printer 11 and the add-in module to obtain print logs installed therein, is configured to enable direct printing from the client 13 to the printer 11.

Figure 2:
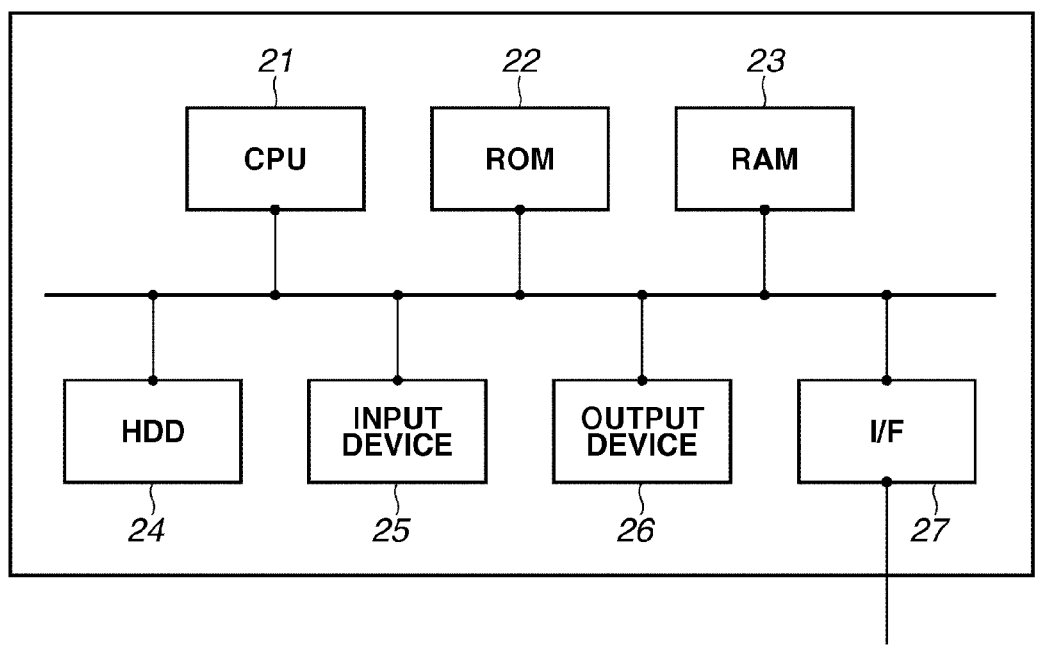
FIG. 2 illustrates a hardware configuration of the data processing system.

FIG. 2 is a block diagram illustrating a hardware configuration of the print server 12, the client 13, the archive server 14, the inspection server 15, the log collection server 16 illustrate in FIG. 1, or an apparatus for inspection.

In FIG. 2, a central processing unit (CPU) 21 directly or indirectly controls various devices (e.g., a read only memory (ROM) and a random access memory (RAM) which will be described below) that are connected thereto via an internal bus, and executes a program to implement the present exemplary embodiment. A ROM 22 stores a basic input/output system (BIOS) therein. A RAM (direct access memory) 23 is used as a work area for the CPU 21 or as a temporary memory to load software modules to implement the present exemplary embodiment.

A hard disk drive (HDD) 24 stores an operating system (OS) as basic software and software modules. A solid state drive (SSD) may be used instead of the HDD 24.

An input device 25 includes a key board and a pointing device (not illustrated). An output device 26 is connected to a display. An interface I/F 27 is used for connection to the network 10.

In the hardware, after the system is started up, the CPU 21 executes the BIOS, and the OS is loaded from the HDD 24 to the RAM 23 to be executed. The CPU 21 loads various software modules, which will be described below, from the HDD 24 to the RAM 23 to be executed, as needed in response to specific operations of the OS. The software modules are executed by the CPU 21 in cooperation with the above described devices.

Figure 3:
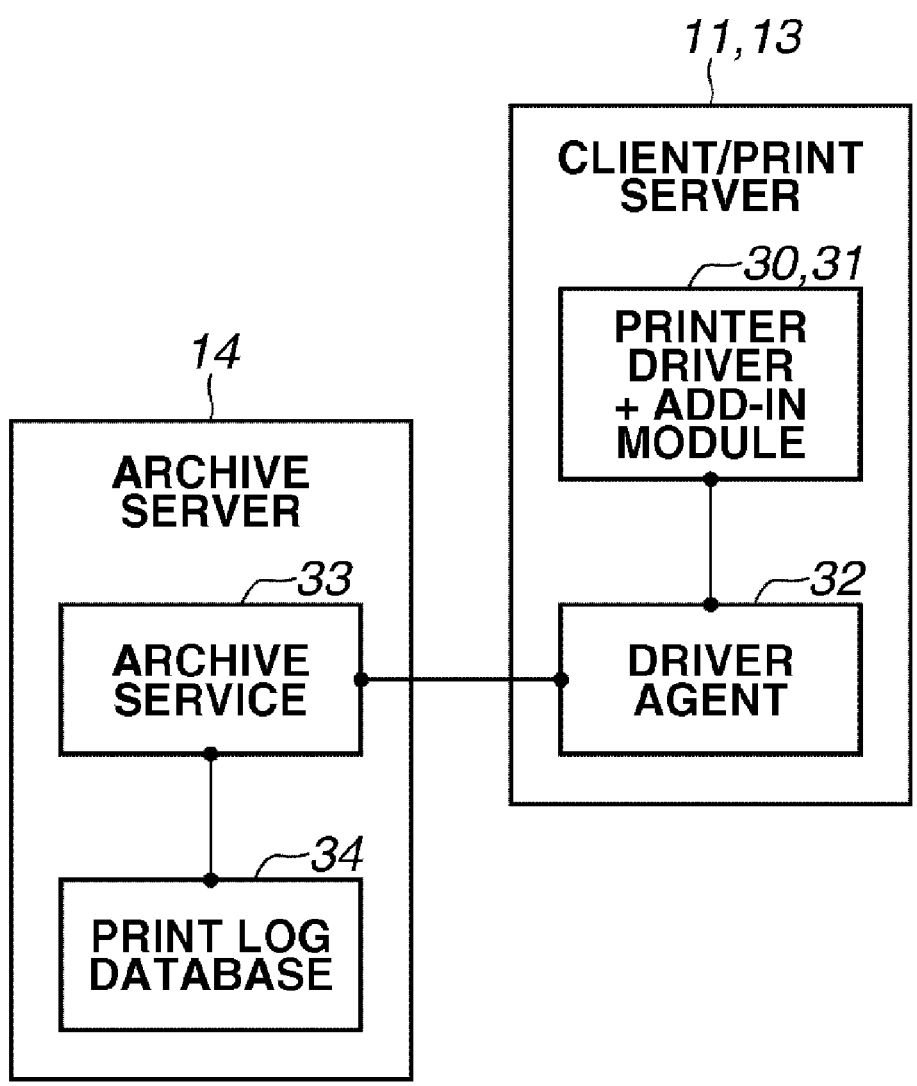
FIG. 3 illustrates a configuration of software modules of the data processing system.

FIG. 3 illustrates a configuration of software modules of the data processing system in FIG. 1. A configuration of the software modules operating over the client 13, the print server 12, and the archive server 14 in FIG. 1 is now described. The software modules are each stored in the HDD 24 in FIG. 2, and are loaded by the CPU 21 to the RAM 23 to be executed, as described above. The client 13 and the print server 12 each include a printer driver 30 for the printer 11 and an add-in module 31 to obtain print logs. The print server 12, and also the client 13 in some cases depending on printing paths, each include a driver agent 32 to transmit print logs from the add-in module 31 to the archive server 14.

The archive server 14 includes an archive service 33 that receives print logs from the driver agent 32 and accumulates the logs in a print log database 34. The print log database 34 may be a software module in the archive server 14, or a hardware that is in communication with the archive server 14 via the network 10.

The print log database 34 is usually a relational database that interprets a query language called structured query language (SQL), and the archive service 33 registers a print log by issuing a SQL sentence to the print log database 34.

Figure 4:
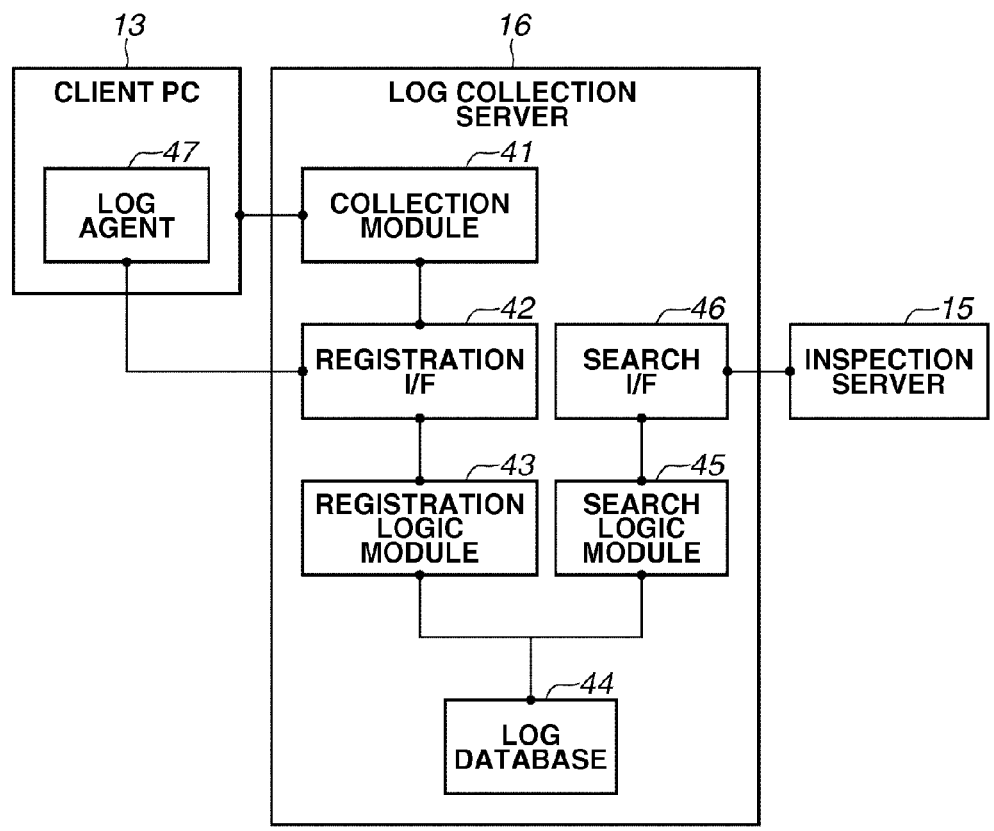
FIG. 4 illustrates a configuration of another software module of the data processing system.

FIG. 4 illustrates a configuration of software modules operating over the log collection server 16 and the client 13 in FIG. 1.

Each of the software modules is stored in the HDD 24 in FIG. 2, and is loaded by the CPU 21 to the RAM 23 to be executed. The log collection server 16 includes a collection module 41 that regularly collects predetermined logs from the client 13, which is in communication with the module 41 via the network 10.

The log collection server 16 further includes a registration I/F 42 for log registration that receives requests for log registration from the collection module 41 and a log agent 47 in the client 13, which will be described below. The logs received in the registration I/F 42 are converted into a predetermined format through a registration logic module 43 to be registered in the log database 44 to be searched.

The collection module 41 collects logs that are stored by an OS installed in the client 13 through a log-collection interface of the OS, or collects log files stored in a predetermined area through a file-access interface of the OS.

The collection module 41 can collect logs from the other general personal computers (PCs), work stations, and servers (not illustrated) that are connected to the network 10, as well as the client 13.

The log database 44 may be a software module in the log collection server 16, or may be hardware that is in communication with the server 16 via the network 10.

The log database 44 is usually a relational database that interprets a query language called SQL, and the registration logic module 43 registers a log by issuing a SQL sentence to the log database 44.

The registration I/F 42 may be a web service that transmits SOAP messages through HTTP, or may use the SysLog protocol.

The log collection server 16 further includes a search logic module 45 for searching for logs stored in the log database 44 based on a predetermined condition. The log searching can be done through the search I/F 46 from any hardware connected to the network 10. The search I/F 46 may be a web service that transmits SOAP messages through HTTP, or may be configured to receive SQL commands. A search condition received in the search I/F 46 is converted, through a search logic, into a language (e.g., SQL) the log database 44 can interpret, and is then issued to perform a search.

The client 13 can have a log agent 47. The log agent 47 monitors the OS operating in the client 13, and generates logs under predetermined conditions. The log agent 47 generates logs, for example, at an access to file system of the OS or at communication with network.

The log agent 47 regularly transmits logs that are generated via the network 10 to the registration I/F 42 of the log collection server 16. The log agent 47 may be configured to regularly transmit logs that are generated in a predetermined area. The log agent 47 may be configured similarly in other general personal computers (PCs), work stations, and servers (not illustrated) connected to the network 10, as well as the client 13.

Figure 5:
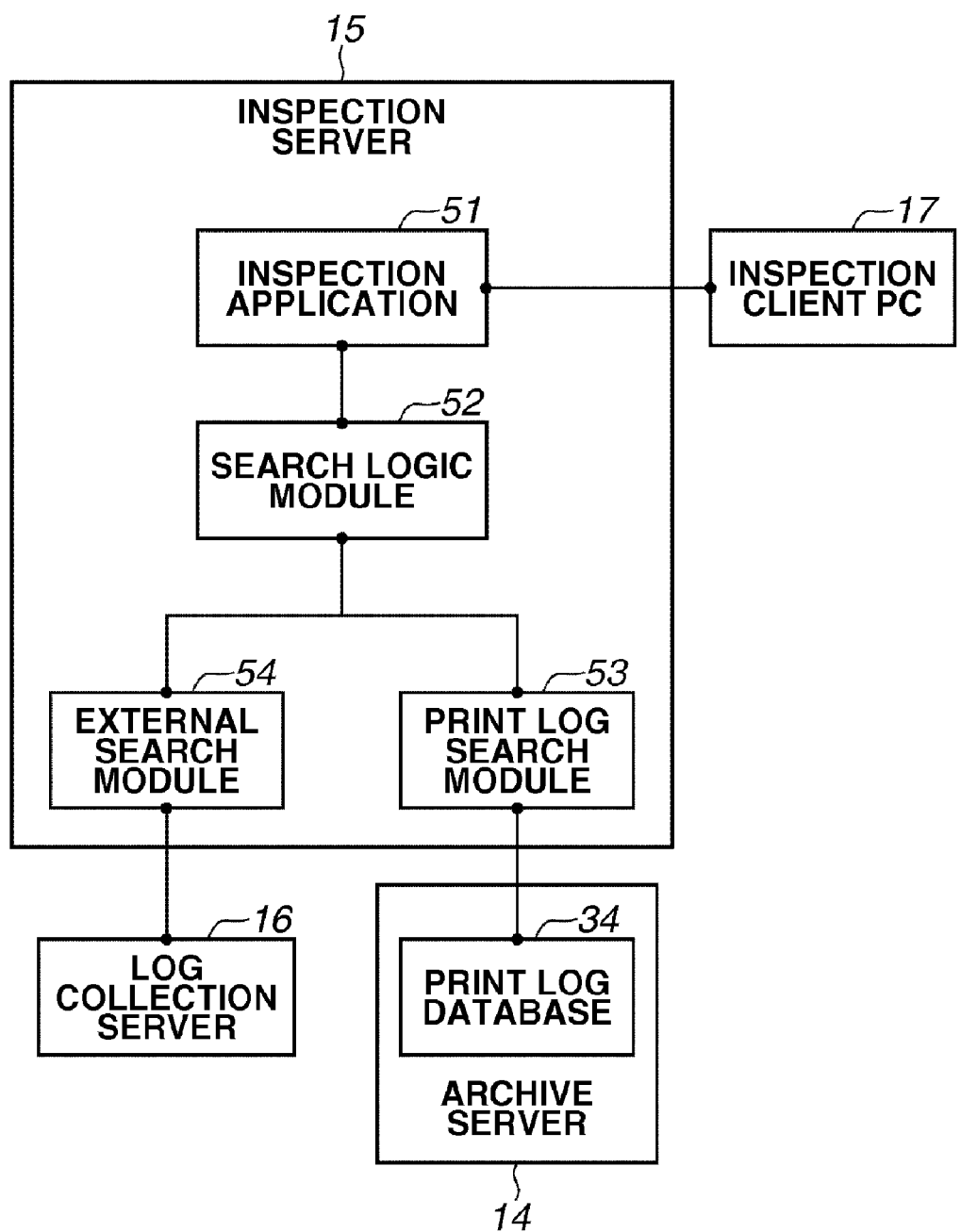
FIG. 5 illustrates a configuration of software modules operating in an inspection server.

FIG. 5 illustrates a configuration of software modules operating in the inspection server 15 in FIG. 1. Each of the software modules is stored in the HDD 24 of the inspection server 15 in FIG. 2, and is loaded by the CPU 21 to the RAM 23 to be executed.

The inspection server 15 includes an inspection application 51. The inspection application 51 is a web application, and the inspection client 17 accesses the inspection application 51 via a web browser.

The inspection application 51 may be a local application having a UI, other than a web application. In this case, the inspection is performed in the inspection server 15.

The inspection server 15 further includes: a search logic module 52 that interprets a search condition set at the inspection application 51 and performs searches in sequence under the condition; a print log search module 53 performing searches on the print log database 34; and an external search module 54 that performs searches on the log collection server 16. The print log search module 53 performs a process for obtaining print log search results from the archive server 14.

The external search module 54 may have a software module as an additional adapter, the software module supporting the search I/F 46 of the log collection server 16 that is connected via the network 10. The operation of the search logic module 52 under a search condition will be described below in detail. The external search module 54 performs a process for obtaining print log search results from the log collection server 16.

Figure 6:
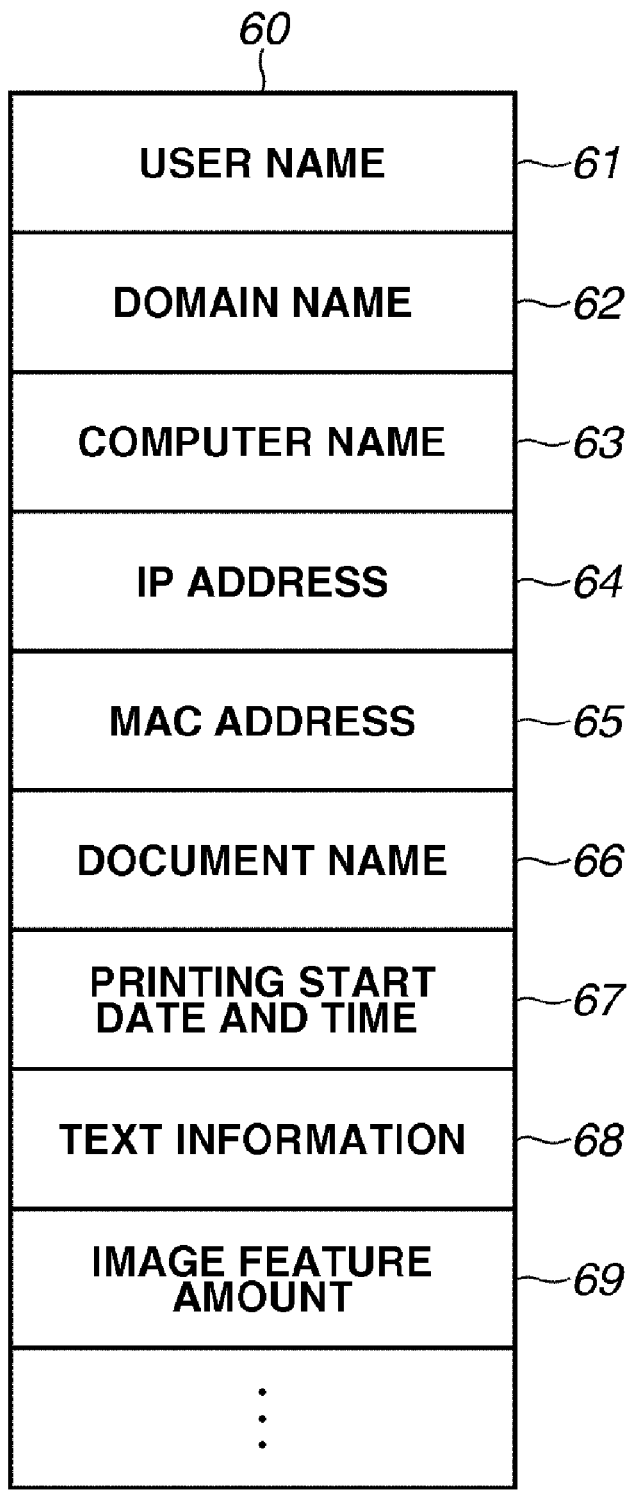
FIG. 6 illustrates a data configuration of a print log.

FIG. 6 illustrates a data configuration of a print log managed by the print log database 34 in FIG. 5.

In FIG. 6, a print log 60 includes a user name 61, a domain name 62, a computer name 63, an IP address 64, a MAC address 65, a document name 66, a printing start date and time 67, text information 68, and an image feature amount 69.

The user name 61 is a user's name who executed printing, and records information that specifies the user who logged in the client 13. The domain name 62 records information that specifies the domain where the user logs in via the client 13.

The computer name 63, the IP address 64, the MAC address 65 each record information of the client 13 that executed the printing. The document name 66 records the name of a document file that is printed. The printing start date and time 67 records the date and time when the user started the printing at the client 13. The text information 68 stores text information contained in the image data of print logs collected by the archive server 14. The text information is extracted by the add-in module 31 or the archive service 33 through optical character recognition (OCR) conversion of the image data.

The software modules of the above processes are stored in the HDD 24 in the inspection server 15 in FIG. 2, and are loaded by the CPU 21 to the RAM 23 to be executed.

The image feature amount 69 is a value representing an image feature that is calculated from the image data of print logs collected by the archive server 14, the calculation being performed by the CPU 21 of the archive server 14 according to a formula set in the archive service 33.

Figure 7:
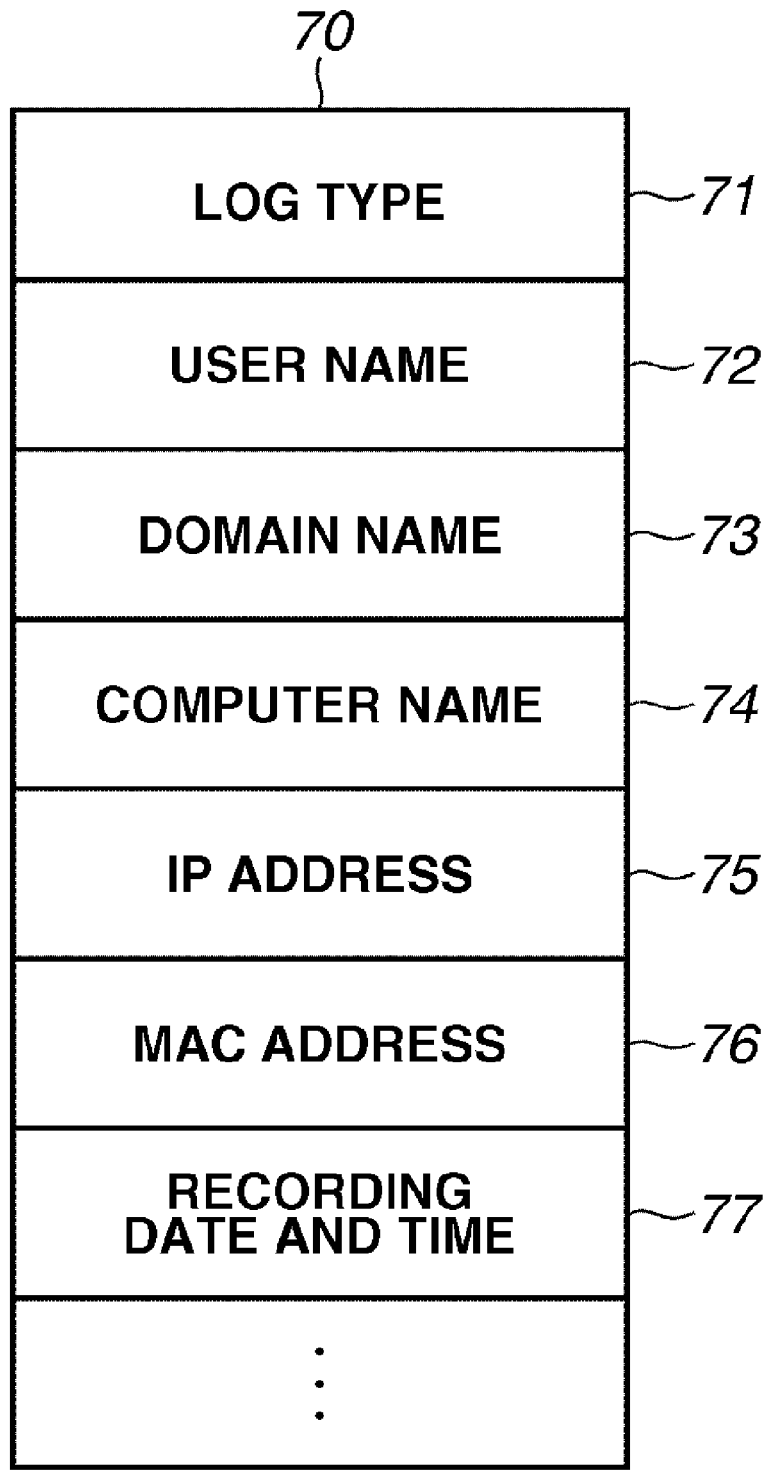
FIG. 7 illustrates a data configuration of a log stored in a log collection server.

FIG. 7 illustrates a data configuration of a log stored in the log collection server 16 in FIG. 1.

In FIG. 7, a log 70 includes a log type 71 specifying a log type, a user name 72, a domain name 73, a computer name 74, an IP address 75, a MAC address 76, and a recording date and time 77.

The log type 71 may be information in a character string form such as "log-in" and "print", or mapped information of IDs corresponding to the types. The user name 72 indicates a user who performed the operation that was recorded in the log, and records information specifying a user who logged in the client 13.

The domain name 73 records information specifying the domain where the user logs in via the client 13. The computer name 74, the IP address 75, and the MAC address 76 each record information of the client 13 where the operation recorded in the log is performed. The recording date and time 77 records the date and time when the log was recorded in the client 13.

FIG. 8 illustrates an inspection user interface (UI) provided by the inspection application 51 of the inspection server 15, the UI being displayed on a web browser of the inspection client 17 in FIG. 1. An inspection UI 80 is displayed on the inspection client 17 when the inspection server 15 receives, from the inspection client 17, a search condition for logs of print jobs and an associated log setting for association with the logs as results of the search under the search condition.

In FIG. 8, the inspection UI 80 has a search condition pane 810 on the left side and a search result pane 820 on the right side.

The search condition pane 810 includes a search execution button 811, a similar image search pane 812, a full text search pane 813, an attribute search pane 814, an associated log setting pane 815, and an essential log setting pane 816.

The similar image search pane 812 is used to select a reference image to set a similar image search condition based on the image. The similar image search condition is used to extract similar print logs by the comparison between the image feature amount of the selected image and those of the stored print logs.

The full text search pane 813 is used to enter a reference text to set a full text search condition based on the text.

The full text search condition is used to extract print logs by the comparison between the reference text and the text information of the stored print logs. The full text search condition can be specified using the AND condition to extract logs containing all of words and phrases specified, the OR condition to extract logs containing at least one of words and phrases specified, the NOT condition to extract logs containing none of words and phrases specified, and a combination thereof.

The attribute search pane 814 is used to enter reference attribute values, and to set an attribute search condition based on the attribute values. The attribute search condition is used to extract print logs by the comparison between the reference attribute values and the attribute values of the corresponding print logs. Examples of the attributes available include user name, domain name, computer name, IP address, MAC address, document name, and printing time period. The illustrated inspection UI 80 displays user name, address, and printing time period among those attributes.

The attribute values can be specified using a combination of the AND condition for the logs having all of the values, OR condition for the logs having at least one of the values, and the NOT condition for the logs having none of the values. The attributes entered in the attribute search pane 814 are set as values for the AND condition. The other attribute settings and combination settings can be done through a detail setting screen (not illustrated) that is displayed when the detail selection button in FIG. 8 is pressed. The printing time period can be specified by a range between the two items of "Year/Month/Day (hour/minute)", so that print logs having printing start date and time within the range are extracted.

After conditions are entered in the corresponding search panes and the search button is pressed, print logs are extracted under the similar image search condition, the full text search condition, and the attribute search condition, each condition being set under the AND condition. The extraction of print logs is performed by transmitting the conditions from the search logic module 52 in the RAM 23 that is loaded by the CPU 21 of the inspection server 15 through the print log search module 53 to the print log database 34, and converting the conditions into a interpretable query language at the print log database 34.

The associated log setting pane 815 can be used to enter setting for prioritization of the extracted print logs, which is a feature of the present exemplary embodiment. More specifically, associations using the attributes can be set between the extracted print logs and the operation logs stored in the log collection server 16. Examples of the attributes available include user name, domain name, machine name, IP address, MAC address, and date and time (period).

The user name, domain name, computer name, IP address, and MAC address are those described for the print logs and the specific log, and the logs having the attributes that are exactly matched are searched for. The time period can be set to include the printing start date and time of the extracted print logs, to search for logs that were stored within the time period. A process for setting priorities based on association will be described below.

The essential log setting pane 816 is used to set a search item (essential log setting item) of a higher priority than the setting in the associated log setting pane 815. In the present exemplary embodiment, the inspection application 51 can perform a setting to highlight some print logs among the print logs that are arranged in the order according to the search items. In other words, the inspection application 51 controls a display mode of print logs based on the search result of print logs and the number of hits notified from the log collection server 16. The display mode in the present exemplary embodiment uses the following highlighting process, but the other display modes that are readily observable to users may be used.

The setting may use the essential log, or the detail setting through the essential log detail setting screen (not illustrated) that is displayed when the detail setting button in FIG. 8 is pressed. Through the detail setting screen, at least one essential log item can be specified. More specifically, one or more value can be set, the value each corresponding to a log type. A process for highlighting based on the essential log item will be described below.

The flow of an inspection process performed on the stored print logs is described with reference to a flowchart. In the present exemplary embodiment, a domain authentication log is used as an essential log setting item, but the other items may be used. Note that, for setting of an essential log setting item, a query condition issued to the log collection server 16 contains a keyword that narrows down log types.

The inspection process starts when the inspection application 51 of the inspection server 15 receives a press down of the search condition pane 810 of the inspection UI 80, which is displayed on the web browser of the inspection client 17.

After receiving the press down of the search condition pane 810 through the inspection UI 80 displayed on the client inspection PC 17, the inspection application 51 instructs the search logic module 52 to perform a search process. The instruction contains, as an argument, the search condition, the associated log setting, and the essential log setting that are entered through the inspection UI 80.

The processes are executed according to the inspection application 51 and the search logic module 52, which are loaded on the RAM 23 by the CPU 21 of the inspection server 15.

Figure 9:
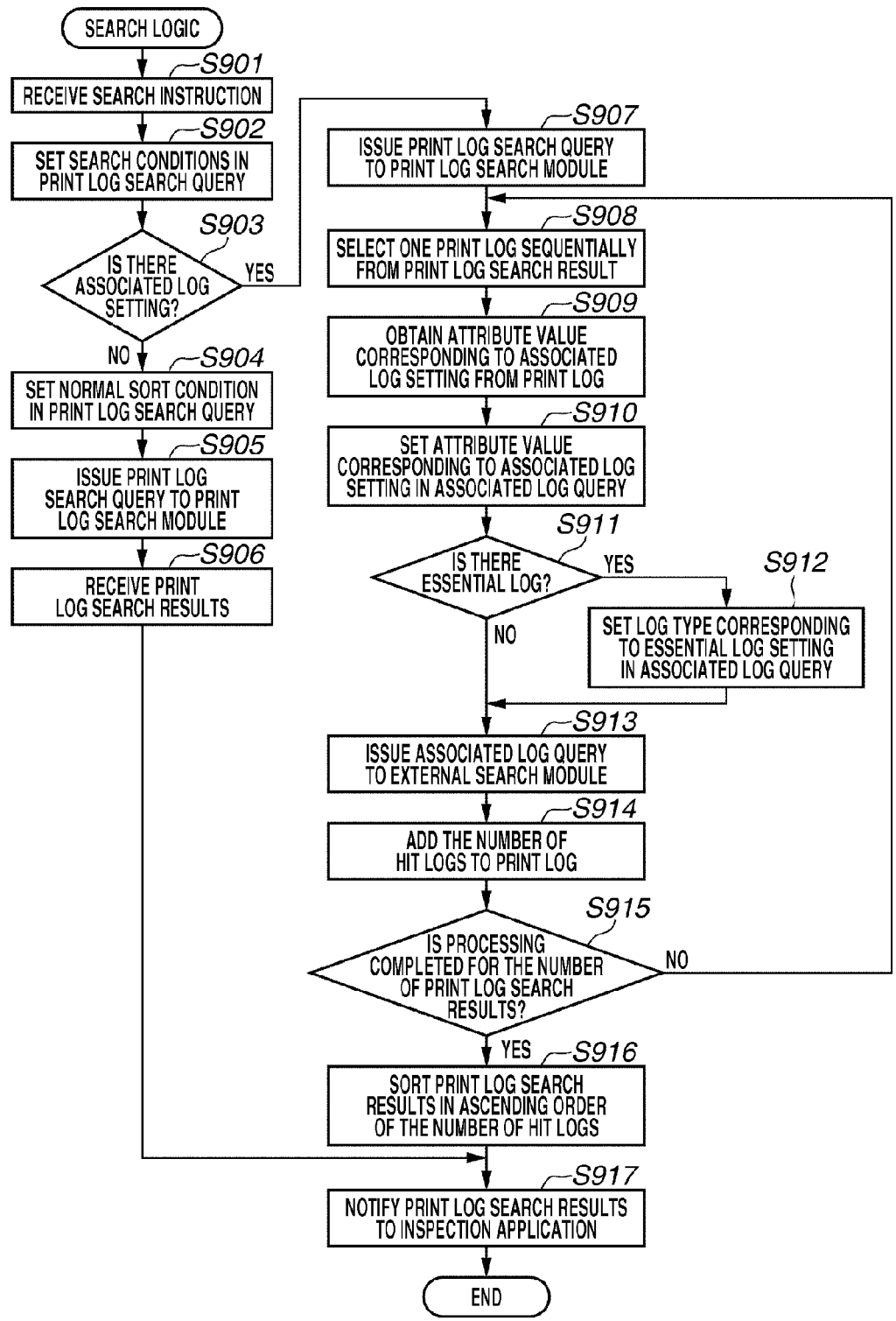
FIG. 9 is a flowchart illustrating a data processing procedure performed by a server apparatus according to an exemplary embodiment of the present invention.

FIG. 9 is a flowchart illustrating an example of a data processing procedure performed by the server apparatus according to the present exemplary embodiment. This example illustrates a flow of a search process performed by the search logic module 52 of the inspection server 15 in FIG. 1. The following is description of control for highlighting of unauthorized print logs, by specifying unauthorized print logs among the searched print logs and changing a display mode of the unauthorized print logs from those of other logs.

The search logic module 52 of the inspection server 15, when received a search instruction from the inspection application 51, performs a search process and returns search results to the inspection application 51. Herein, the procedure illustrated in FIG. 9 is loaded as the search logic module 52 to the RAM 23 of the inspection server 15 and executed by the CPU 21.

In step S901, the search logic module 52 receives a search instruction from the inspection application 51. The instruction includes the specifications of a search condition, an associated log setting, an essential log setting as an argument that can be set through the inspection UI 80 illustrated in FIG. 8, for example. In step S902, the search logic module 52 generates a query (print log search query) to the print log search module 53, and sets the specified search conditions in the query.

In step S903, the search logic module 52 determines whether an associated log setting is specified in the associated log setting pane 815 of the inspection UI 80 illustrated in FIG. 8 by a user. When the search logic module 52 determines that there is no setting, the process proceeds to step S904. When the search logic module 52 determines that there is a setting, the process proceeds to step S907.

In step S904, the search logic module 52 sets a sort condition with respect to the print log search query, the sort condition specifying the sorting order of the search results. For example, the order based on the print log items can be specified as the sort condition, which can be specified by the inspection application 51, or can be set as a default in the search logic module 52.

In step S905, the search logic module 52 issues a print log search query to the print log search module 53. When receiving the print log search query, the print log search module 53 converts the query to another one that can be interpreted by the print log database 34, and issues the resulting query to the print log database 34.

The print log search module 53 receives search results from the print log database 34, and notifies the search logic module 52 of the search results. The print log search module 53 is loaded to the RAM 23 of the inspection server 15 and is executed by the CPU 21.

In step S906, the search logic module 52 receives the search results from the print log search module 53. The process then proceeds to step S917.

The following is description of a process performed when the search logic module 52 determines that an associated log setting is specified in step S903.

In step S907, the search logic module 52 issues a print log search query (search request) to the print log search module 53. When receiving the print log search query, the print log search module 53 converts the query to another one that can be interpreted by the print log database 34, and issues the resulting query to the print log database 34. The print log search module 53 receives search results from the print log database 34, and notifies the search logic module 52 of the search results. The print log search module 53 is loaded to the RAM 23 of the inspection server 15 and is executed by the CPU 21.

In step S908, the search logic module 52 receives search results from the print log search module 53, and selects one print log sequentially from the received search results, and performs the following processes for every print log.

In step S909, the search logic module 52 obtains attribute values set in the associated logs, from the selected print logs. In step S910, the search logic module 52 generates a query (associated log search query) to the external search module 54, and sets the set condition values in the query.

In step S911, the search logic module 52 determines whether an essential log setting is specified in the essential log setting pane 816 of the inspection UI 80 illustrated in FIG. 8 by a user. When the search logic module 52 determines that there is an essential log setting, the process proceeds to step S912. When the search logic module 52 determines that there is no setting, the process proceeds to step S913.

Instep S912, the search logic module 52 additionally sets a value for log type that corresponds to the essential log setting in the associated log search query. The associated log search query in the present exemplary embodiment is composed of elements that request only the number of hits as a search result. In the case where the essential log setting is valid, queries can be generated to obtain the number of hits for the associated log setting and to obtain the number of hits for the products of the associated log setting and the essential log setting.

In step S913, the search logic module 52 issues the log search query (associated log search request) to the external search module 54. The external search module 54, when receiving the associated log search query, converts the query to another one that can be interpreted by the log collection server 16, and issues the resulting query to the log collection server 16. The external search module 54 receives search results from the log collection server 16, and notifies the search logic module 52 of the search results. The external search module 54 is loaded to the RAM 23 of the inspection server 15 and is executed by the CPU 21.

In step S914, when receiving the search results, the search logic module 52 sets the number of hit search results as an additional attribute value in the selected print log. When there is an essential log setting, two items are added: the number of hits (the number of hit logs) for the query based on the associated log setting, and the number of hits (the number of hit essential logs) for the query based on the associated log setting and the essential log setting. The steps S908 to S914 are repeated for every print log in the search results.

Then, if, in step S915, the search logic module 52 determines that the process is completed for every print log in the search results, the process proceeds to step S916. In step S916, the search logic module 52 sorts the print log search results in the ascending order for the number of hit logs.

The sort condition maybe the number of hit essential logs instead of the number of hit logs. Alternatively, a first sort condition of the number of hit essential logs and a second sort condition of the number of hit logs maybe set as a complex condition. In the present exemplary embodiment, the number of hit logs is set as the sort condition.

In step S916, the search logic module 52 notifies the inspection application 51 of the results sorted by the setting as print log search results. Then, the process ends. In the case where the number of hit logs and the number of hit essential logs are set as additional attribute values, the results including the values are notified.

FIG. 10 illustrates an example of a search result screen displayed in the search result pane 820 of the inspection UI 80 in FIG. 8.

The screen of the inspection UI 80 in FIG. 10 is, as described above, generated by the inspection application 51 of the inspection server 15, and is displayed on a web browser of the inspection client 17. The inspection application 51 reflects the search results received from the search logic module 52 in a search result list 1001 on the search result pane 820. The inspection application 51 is loaded to the RAM 23 of the inspection server 15 and is executed by the CPU 21, to generate screen information that can be interpreted by the web browser. The inspection application 51 notifies the information as a response to a request that is made by a press down of the search button through the web browser of the inspection client 17.

In FIG. 10, the search result list 1001 arranges the logs in the sort order determined in the process flow by the search logic module 52.

Accordingly, in the case of an associated log setting for the search, the log of the lowest number of hits is at the top of the list.

The logs of the lower number of hits are considered to be the printing logs that have been made in unexpected manner and were not collected or managed by modules. Therefore, the more questionable print logs can be listed at higher positions.

In the case where the number of hit essential logs is set in the search results from the search logic module 52, the inspection application 51 may be configured to highlight those having no hit essential logs.

In FIG. 10, the top two in the search result list 1001 have no hit essential logs, and are displayed in a background color different from that for other print logs to be highlighted. As a result, more questionable print logs are readily observable to users.

The above processes enable priority check of print logs that were printed in unexpected manner and were not collected or managed by modules among a vast amount of accumulated print logs including authorized and authorized print logs. In other words, not only the print logs but also the logs recording computer operations are inspected, thus enabling more precisely specifying unauthorized printing.

The present invention can be implemented by executing the following processes. Software (program) for achieving the functions of the above-described exemplary embodiments is supplied to a system or apparatus via a network or other storage medium, and a computer of the system or apparatus (e.g., CPU or MPU) reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-298348 filed Dec. 28, 2009, which is hereby incorporated by reference herein in its entirety.

What is claimed is:

1. A server apparatus for communicating with a print log management server that manages print logs corresponding to print jobs processed in a printing apparatus and a user log management server that manages user logs corresponding to operations of each of users who log-in a client apparatus, the server apparatus comprising at least a processor functioning as:

a receiving unit configured to receive, from an inspection client apparatus, a search condition for the managed print logs and an associated log setting that includes one or more items for specifying, from the managed user logs, user logs associated to each of print logs searched under the search condition;

a first obtaining unit configured to output a first search request corresponding to the search condition received by the receiving unit to the print log management server, and to obtain a search result for the first search request from the print log management server;

a second user obtaining unit configured to output a second search request related to the associated log setting received by the receiving unit to the user log management server, and to obtain a number of hits corresponding to each of print logs contained in the search result obtained by the first obtaining unit for the second search request from the user log management server, the number of hits indicating the number of user logs specified as having a same value about one or more items included in the associated log setting corresponding to each of the print logs; and a control unit configured to control a display mode of the print logs contained in the search result obtained by the first obtaining unit according to the number of hits corresponding to each of the print logs obtained by the second obtaining unit, wherein, when the receiving unit receives further an additional setting that includes setting of a log type, the control unit controls the display mode of the print logs according to the number of hits corresponding to each of the print logs and the additional setting.

2. The server apparatus according to claim 1, wherein the control unit controls the display mode so that the print logs are displayed in an ascending order of the number of hits.

3. The server apparatus according to claim 1, wherein the one or more items included in the associated log setting indicate at least one of user name, machine name, address, document name, and date and time.

4. The server apparatus according to claim 1, wherein the setting of the log type indicates a domain authentication log.

5. A log inspection method for a server apparatus for communicating with a print log management server that manages print logs corresponding to print jobs processed in a printing apparatus and a user log management server that manages user logs corresponding to operations of each of users who log-in a client apparatus, wherein the server apparatus includes at least a processor, the log inspection method comprising:

receiving, from an inspection client apparatus, a search condition for the managed print logs and an associated log setting that includes one or more items for specifying, from the managed user logs, user logs associated to each of print logs searched under the search condition;

outputting a first search request corresponding to the received search condition to the print log management server, and obtaining a search result for the first search request from the print log management server;

outputting a second search request related to the received associated log setting to the user log management server, and obtaining a number of hits corresponding to each of print logs contained in the search result obtained by the first search request for the second search request from the user log management server, the number of hits indicating the number of user logs specified as having a same value about one or more items included in the associated log setting corresponding to each of the print logs; and controlling a display mode of the print logs contained in the obtained search result from the first search request and the obtained number of hits corresponding to each of the print logs from the second search request, wherein, when an additional setting that includes setting of a log type is further received, the display mode of the print logs is controlled according to the number of hits corresponding to each of the print logs and the additional setting.

6. A non-transitory computer-readable storage medium storing a program for causing a computer to execute the log inspection method according to claim 5.

* * * * *